United States Patent [19]
Cahill et al.

[11] 3,752,956
[45] Aug. 14, 1973

[54] ELECTRICAL RESISTANCE HEATING CONTROL CIRCUIT

[75] Inventors: Harold James Cahill, Wilmington; Cornelius James Erickson, Newark, both of Del.

[73] Assignee: E. I. du Pont de Nemours and Company, Wilmington, Del.

[22] Filed: May 3, 1972

[21] Appl. No.: 249,821

[52] U.S. Cl.................. 219/505, 219/497, 219/499
[51] Int. Cl. ............................................ H05b 1/02
[58] Field of Search.................. 219/494, 497, 499, 219/501, 504, 505

[56] References Cited
UNITED STATES PATENTS

| | | |
|---|---|---|
| 3,215,818 | 11/1965 | Deaton .............................. 219/499 |
| 3,299,345 | 1/1967 | Werts............................. 219/499 X |
| 3,512,077 | 5/1970 | Evalds............................. 219/499 |
| 3,679,871 | 7/1972 | Evalds............................. 219/499 |

*Primary Examiner*—Bernard A. Gilheany
*Assistant Examiner*—F. E. Bell
*Attorney*—Harry J. McCauley

[57] ABSTRACT

Apparatus for maintaining an electrical resistance load at substantially constant operating resistance level utilizing the sensed current and voltage inputs as joint control parameters.

7 Claims, 6 Drawing Figures

PATENTED AUG 14 1973

ELECTRICAL RESISTANCE HEATING CONTROL CIRCUIT

BRIEF SUMMARY OF THE INVENTION

Generally, this invention comprises apparatus for maintaining an electrical resistance load having a resistance characteristic varying with temperature at substantially constant operating resistance level comprising an electrical source, means connecting the resistance load to the electrical source, a voltage monitoring resistor connected in shunt with the resistance load, an electric current monitoring resistor connected in series with the resistance load, individual thermistors disposed in close proximity with the voltage monitoring resistor and with the current monitoring resistor, the thermistors being connected in opposed circuit relationship through a manually settable potentiometer, and power controller means responsive to the position of the tap of the potentiometer and temperature changes in the thermistors adjusting concurrently the current and voltage supplied from the electrical source to the resistance load to maintain the temperature of the resistance load substantially constant independent of the environment in which the resistance load is located.

DRAWINGS

In the drawings,

FIG. 1 is a Percent Change in Resistance v. Temperature (° C.) plot for a typical electrical heating element constituting the load according to this invention, FIG. 2 is a circuit diagram of a basic a-c apparatus constructed according to this invention, FIG. 3 is a circuit diagram of an auxiliary circuit for use in conjunction with the circuit of FIG. 2 to increase the response to sensed deviations of the thermistors, FIG. 4 is a circuit diagram of an auxiliary circuit for use in conjunction with the circuit of FIG. 2 to limit the maximum current available from the controller of FIG. 2, FIG. 5 is a circuit diagram of an auxiliary circuit for use in conjunction with the circuit of FIG. 2 to safeguard against immediate full-on operation in achieving obtainment of a preselected resistance load operation level by restraining the load current rate of rise, and FIG. 6 is a circuit diagram showing the assembly of the auxiliary circuits of FIGS. 3, 4 and 5 with the basic apparatus of FIG. 2.

DETAILED DESCRIPTION

Electrical industrial resistance heating systems, such as those used for pipe lines, storage tanks or other purposes, are ordinarily difficult to design and install because of lack of information of all parameters and complications of heat transfer modes. Moreover, changes in heated pipe line lengths or inter connections, sometimes made long after the original installation, can change the heat requirements markedly.

It is desirable to have an apparatus with broad capabilities so that changes in system parameters can be accommodated without redesign or repeat field installations. This invention meets these requirements by providing an automatically controlled system which is self-compensating for changes in design parameters within broad limits.

In addition, the invention system dispenses with separate temperature measuring devices, such as thermostats, thermocouples or thermistors installed at the heater site per se by utilizing the heating element itself as the temperature measuring agency. This saves on wiring and maintenance of these temperature sensors, which are usually fragile and installed under field conditions which can be wet, corrosive or hazardous.

Figure 2:
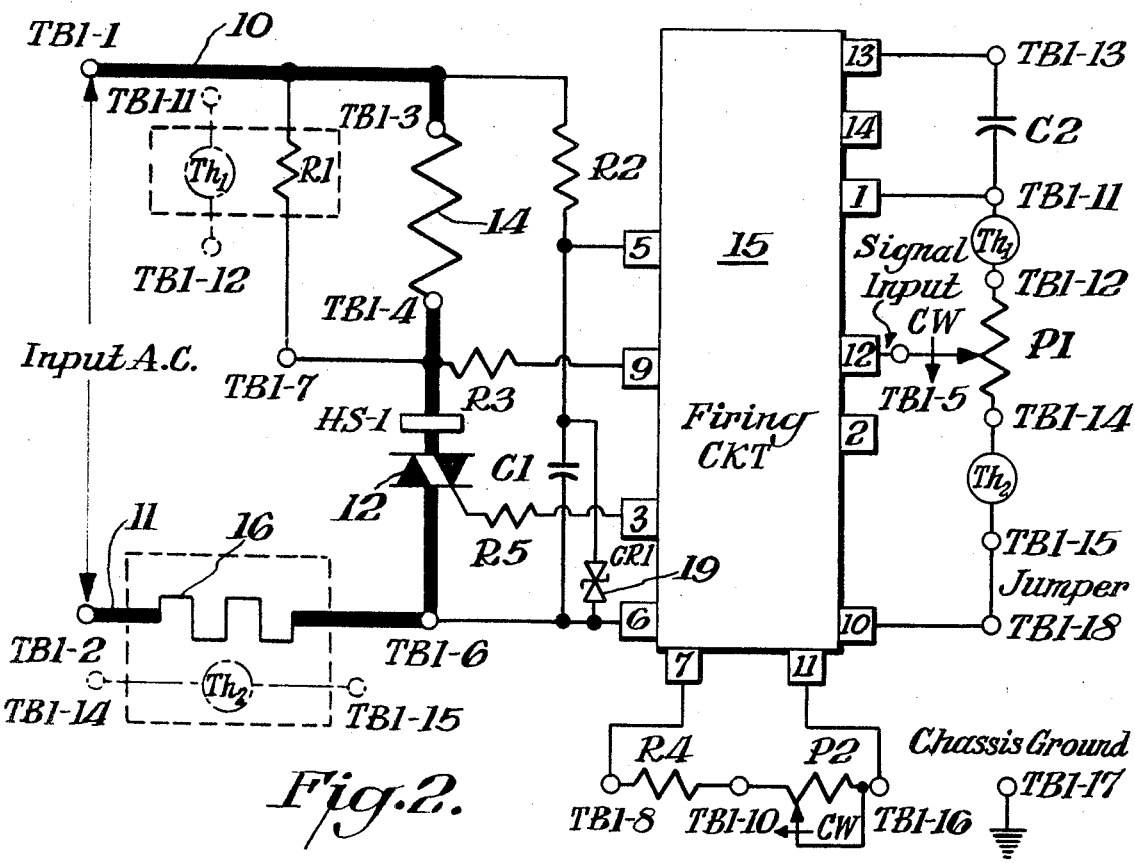

Referring to FIG. 2, the power circuit of this invention is shown in relatively heavy line representation, whereas control circuitry is denoted in lighter line representation.

An alternating current apparatus is shown in the drawings, because this is the most common resistance heating mode utilized in industry; however, the invention can readily employ a d-c power supply as hereinafter detailed.

The a-c power input is supplied through left-hand terminals TB1-1 and TB1-2 via power lines 10 and 11 connecting with terminals TB1-3 and TB1-4 across which the load, indicated as resistance 14, is connected.

Figure 1:
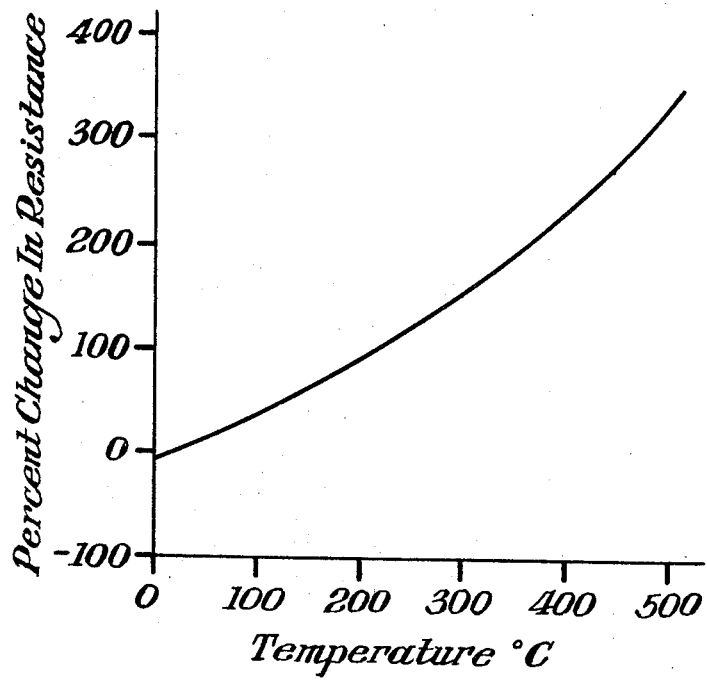

The load employed is an electric heating element having an ohmic resistance possessing a known and predictable value for each and every temperature value over a wide and useful range. One such resistive material is that referred to as Balco, which has a general composition of 70 percent nickel, 30 percent iron and possesses the Percent Change in Resistance v. Temperature in ° C. plotted in FIG. 1. Other commercially available variable resistance alloys exist and the use of these as heating elements is practicable in this invention so long as the unit change in resistance with temperature is large enough to permit precise selection of operating temperature in terms of resistance. As indicated in FIG. 1, the steeper the plot slope the better, within obvious limits.

Regulation of the supply of operating power to the load is achieved by a bidirectional solid state device 12, which can be a conventional Triac (RCA 40714) as shown, which is gated to the ON state by a conventional firing circuit denoted generally at 15. The firing circuit, in this instance, is a General Electric Co. integrated circuit phase control Model PA436, which is connected in gating relationship to Triac 12 through voltage limiting resistor R5.

A protective heat sink, denoted HS-1, can be interposed between the load and Triac 12.

The power circuit is completed to terminal TB1-2 through a series-connected current supply monitoring resistor 16, typically 0.03 ohm.

Voltage monitoring is effected by resistor $R_1$, typically 10,000 ohms, which is connected in shunt with respect to the load 14. Finally, it is desirable to provide voltage indication by a voltmeter VM shunt-connected with respect to the load, and current indication by an ammeter AM connected in series with the load (refer FIG. 6).

The sensors employed herein are thermistors $Th_1$ and $Th_2$ having resistance characteristics inversely proportional to temperature, and the respective locations of $Th_1$, which is physically mounted on the surface of $R_1$, and $Th_2$, which is physically mounted on the surface of resistor 16, are denoted in broken line representation with respect to the power circuit, but in solid line representation as regards the control circuit within which the two thermistors are connected.

Thermistors $Th_1$ and $Th_2$ are connected in opposition through potentiometer $P_1$, the tap of which is connected to socket terminal 12 of firing circuit 15 to furnish the signal input upon which control is based.

Firing circuit 15 draws its operating voltage via socket terminal 5 from the a-c line through current-limiting resistor $R_2$, over-voltage protection being provided by double Zener diode 19. The integrated circuit embodies a rectifier and solid state circuitry which delivers a clamped wave form appearing between socket terminals 1 and 10 constituting the pedestal and reference potential levels. This wave shape is a full-wave rectifier sinusoid.

The d-c signal from the $Th_1$-$P_1$-$Th_2$ feed back circuit charges firing capacitor $C_2$ to the pedestal level through transistor components of firing circuit 15 not detailed with current limited by a resistor internal of the firing circuit. Capacitor $C_2$ continues charging by a half sine-wave current supplied from circuit 15 forming a negative cosine ramp. Amplitude of the ramp charging current is determined by the setting of gain control potentiometer $P_2$.

A differential amplifier component of firing circuit 15 compares capacitor $C_2$ voltage with reference voltage. Common mode current of the differential amplifier is controlled by a lock-out gate component of firing circuit 15. When load current is flowing through Triac 12, there is insufficient drive to enable conduction of common-mode current; hence the comparator is inhibited from producing an output signal to the Triac trigger until after zero crossing of the line current. When voltage appears across the Triac, current through resistor $R_3$ unlocks the lock-out gate and permits normal functioning of the comparator. The value of $R_3$, typically 220K ohms, determines the Triac voltage required to enable the comparator.

Trigger pulses are generated by a bilateral solid state switch internal of firing circuit 15, which discharge the external capacitor $C_1$ into the gate of Triac 12. The bilateral switch is triggered by conduction through a transistor in the comparator circuit when the ramp voltage drops below the reference level, but only if common mode current can flow through the lock-out gate. The trigger pulses alternate with the same polarity as the a-c line voltage, thereby passing current through the load 14 on every half cycle at an angle of lag preselected by the $Th_1$-$P_1$-$Th_2$ feedback circuit.

In order to avoid carry-over information from one half-cycle to the next, capacitor $C_2$ must be reset to a fixed level at the end of each half-cycle. This reset function is effected by a transistor internal of firing circuit 15, which is biased off by a resistor network until supply voltage approaches zero. The capacitor voltage then provides a base drive to the transistor, thereby discharging capacitor $C_2$ to the base-emitter voltage drop.

In operation, the voltage across heater 14 is measured at all times by the heat generated in resistor $R_1$, which is proportional to the square of the voltage $V_h$ across the heater, i.e., watts $= V_h^2/R_1$.

This heat is measured by $Th_1$, which has a resistance characteristic inversely proportional to temperature.

Similarly, the current $I_h$ through the load 14 is measured by the heat generated in resistor 16, i.e., watts $= I_h^2 \cdot R_{16}$.

This heat is measured by $Th_2$, which also has a resistance characteristic inversely proportional to temperature.

The opposed resistances of $Th_1$ and $Th_2$ are continually reflected in the net voltage supplied as the input signal from the tap of potentiometer $P_1$ to firing circuit 15.

When the circuit is initially energized, potentiometer $P_1$ is adjusted by reference to ammeter AM so that the amperes supplied to the load are such that the heater 14 attains the temperature supplying the required heat. At this position of $P_1$ the resistances of $Th_1$ and $Th_2$ bias the input of firing circuit 15 enough to provide output to Triac 12 at required level.

If some upset in the system should require more heat from the load 14, the ambient temperature at the heater would be lowered, causing the temperature of the heater itself to fall. While the voltage across the heater remains the same, the current through the heater will increase. This causes the heat generated in resistor 16 to increase, changing the resistance characteristic of $Th_2$ and unbalancing the feedback circuit $Th_1$-$P_1$-$Th_2$. This unbalance increases the output of firing circuit 15, which thereupon increases the voltage output of Triac 12 until the resistance of heater 14 is increased to its original value and temperature. At this point the increased voltage generates more heat in $R_1$ and, thus, changes the resistance of $Th_1$ to rebalance the feedback circuit $Th_1$-$P_1$-$Th_2$. The opposite effect ensues upon an increase of ambient temperature at the heater.

Figure 3:
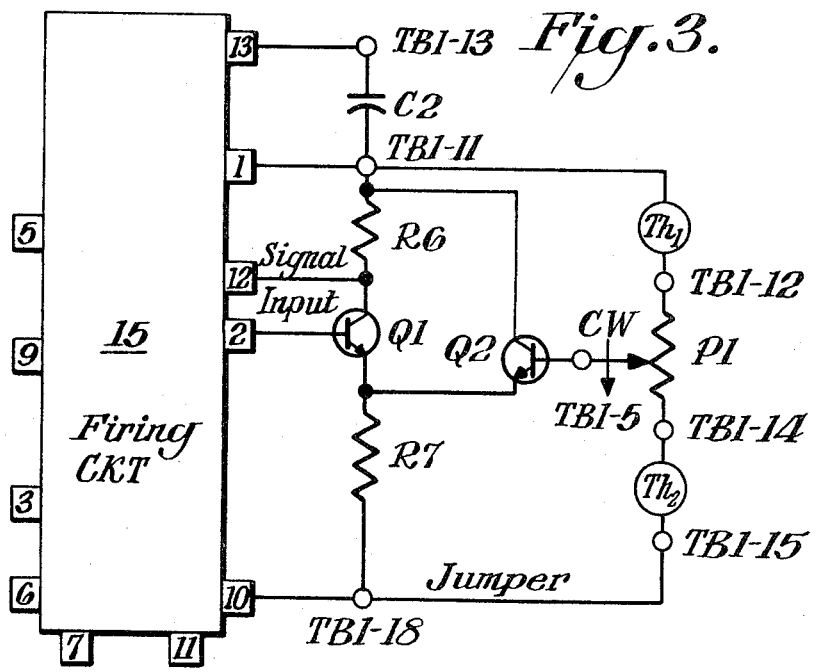

Referring to FIG. 3 there is shown a differential amplifier auxiliary for the signal input to firing circuit 15.

Transistors $Q_1$ and $Q_2$ are transistors having a moderate gain in the range of approximately 20-200, parallel-connected from terminal TB1-11, i.e., socket terminal 1 of firing circuit 15, to terminal TB1-18 i.e., socket terminal 10 of firing circuit 15, through resistor $R_7$, except that a resistor $R_6$ is interposed ahead of the collector of $Q_1$ and the signal input to the firing circuit 15 is drawn off to socket terminal 12 from a point between the $Q_1$ collector and resistor $R_6$.

The base of transistor $Q_1$ is maintained at a constant reference voltage supplied by socket terminal 2 of firing circuit 15, whereas the base of transistor $Q_2$ is connected to the tap of the $Th_1$-$P_1$-$Th_2$ feedback circuit.

Transistors $Q_1$ and $Q_2$ are conducting at all times; however, when a signal potential is supplied to the base of transistor $Q_2$ via the $P_1$ potentiometer tap, more current is drawn through $Q_2$. This raises the potential at the $Q_1$ emitter end of resistor $R_7$, which thus reduces the current flow through transistor $Q_1$ and resistor $R_6$. This raises the potential of the signal input to socket terminal 12 by the amplification factor desired.

Figure 4:
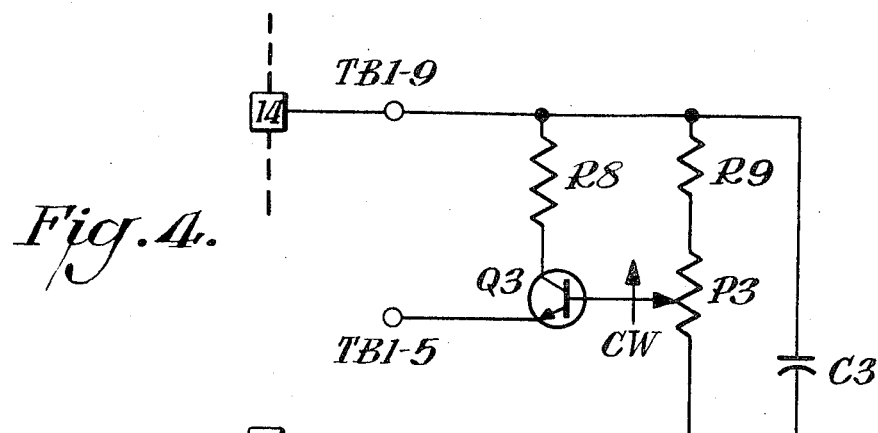

Referring to FIG. 4 there is shown a supplemental circuit adapted to limit the maximum current available from the controller. This maximum current is adjustable by potentiometer $P_3$ connected in series with resistor $R_9$ between terminals TB1-9 (socket terminal 14) and TB1-18 (socket terminal 10). Filter capacitor $C_3$ is connected in shunt therewith. Transistor $Q_3$ is an n-p-n transistor having it emitter connected to terminal TB1-5 disposed on the tap of signal input potentiometer $P_1$ and its base connected with the tap of potentiometer $P_3$.

Resistor $R_8$ in circuit with the collector of transistor $Q_3$ is proportioned so that, if the voltage on TB1-5 (and the emitter of $Q_3$) is approximately equal to the preset voltage on the tap of potentiometer $P_3$ there will be no conduction through transistor $Q_3$. This is the condition existing during normal operation. However, if the voltage on TB1-5 approaches a magnitude which the supplemental circuit is proportioned to safeguard against, terminal TB1-5 becomes negative with respect to the tap of potentiometer $P_3$, which places transistor $Q_3$ in conduction and prevents the input signal delivered to firing circuit 15 from rising above the preset level.

Figure 5:
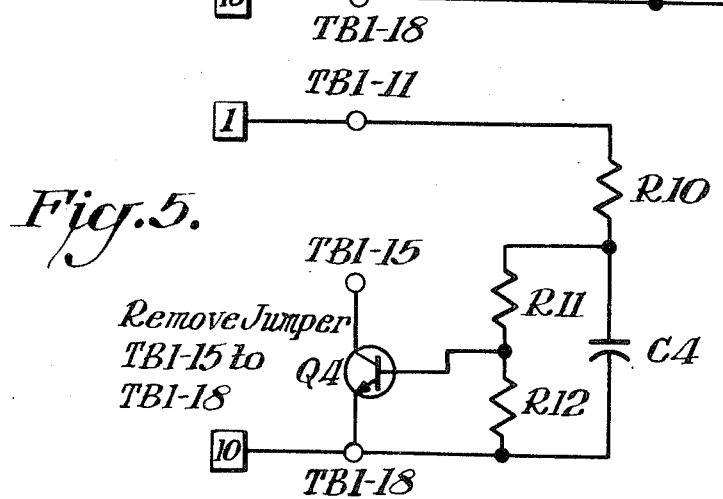

Referring to FIG. 5 there is shown a supplemental circuit adapted to limit the initial rate of change of voltage when the apparatus is first switched on. This, thus, prevents the controller from driving full on when energized on a heating element at lower than desired temperatures but will slowly raise the current to required value.

This comprises an n-p-n transistor $Q_4$ connected via its collector to terminal TB1-15 and via its emitter to terminal TB1-18 so that transistor $Q_4$ is in series with respect to the $Th_1$-$P_1$-$Th_2$ feedback circuit. The base of transistor $Q_4$ is connected to terminal TB1-18 through a voltage divider $R_{11}$-$R_{12}$ shunted by a capacitor $C_4$ which is, in turn, connected through a resistor $R_{10}$ across terminals TB1-11 (socket terminal 1) and TB1-18 (socket terminal 10).

When power is applied to the controller circuit, capacitor $C_4$ charges and the time constant of the $R_{10}$, $C_4$ sub-circuit is preselected to be of the order of 1–8 seconds, thus delaying switch-or of transistor $Q_4$ correspondingly. This insures a "soft" start-up of the entire control circuit.

Figure 6:
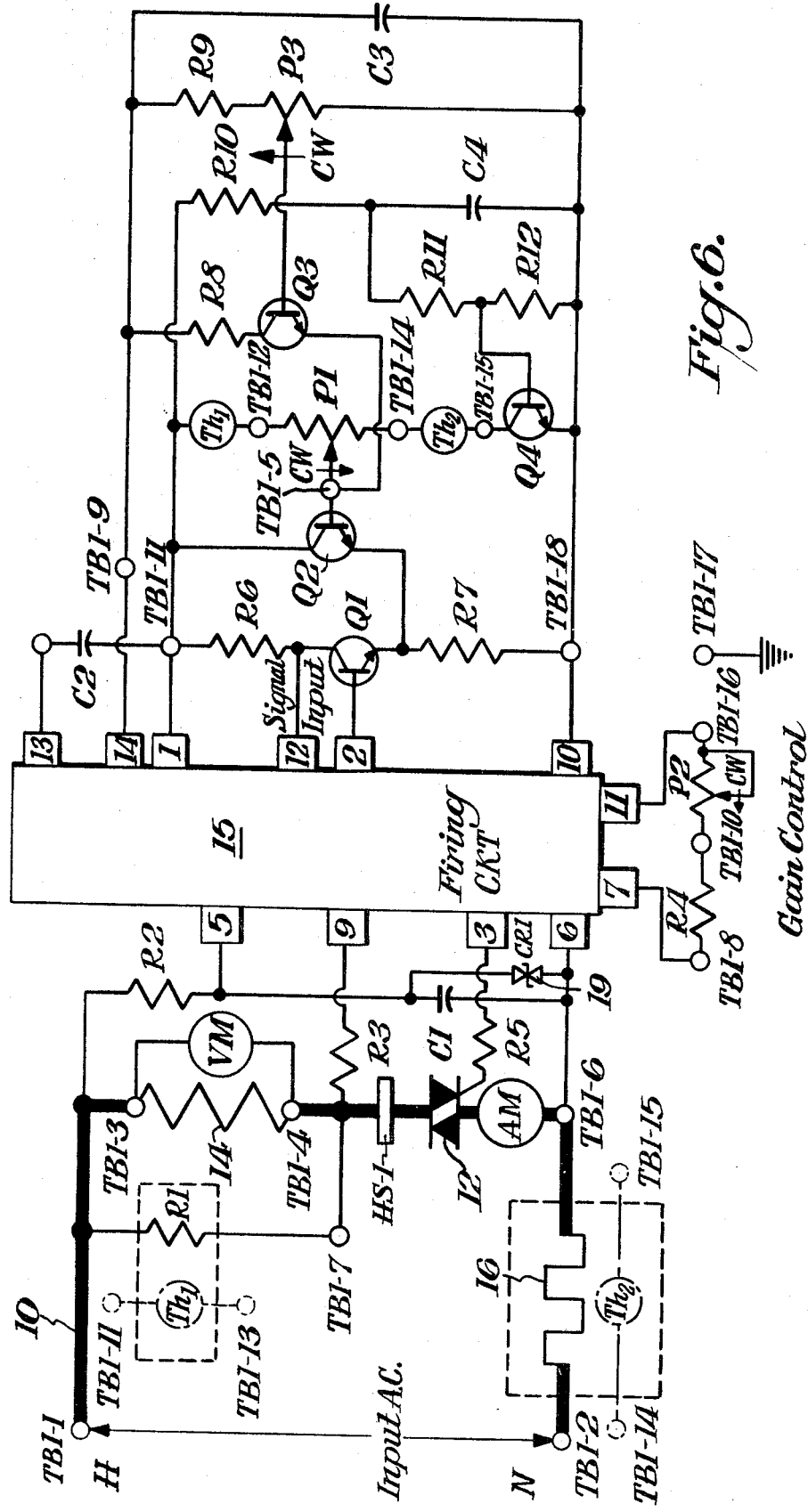

FIG. 6 shows the heating apparatus of FIG. 2 in circuit relationship with all of the auxiliary circuits of FIGS. 3, 4 and 5, it being understood that any one or more of the auxiliaries can be incorporated, if desired, since each is independent of the others.

Field calibration of the apparatus of this invention is accomplished as follows. After the variable resistance heating element 14 is installed and connected to the controller, the tap of potentiometer $P_1$ should be turned completely counterclockwise (refer to "c-w", i.e., "clockwise" conventions adjacent all potentiometer taps), corresponding to minimum setting. The circuit is then energized and the tap of potentiometer $P_1$ is turned slowly clockwise until the ammeter AM reads a value which is specified by the design engineer as the setting necessary to provide heat to the circuit at ambient temperature conditions. The tap of potentiometer $P_1$ should be readjusted as the system heats up until a stable ampere reading is obtained. No further manual adjustments are necessary after this stable setting is attained. The controller will thereafter automatically compensate for changes in ambient temperature.

A d-c power supply can be utilized instead of a-c; however, the control circuitry would then, of course, have to be modified to function on d-c and a switching element such as an SCR substituted in the load circuit for Triac 12.

While thermistors are preferred for reasons of economy, different sensors can be substituted to effectively obtain measures of the resistances interposed in the feedback circuit to develop the input signal supplied to the controller. Thus, a potential transformer could be substituted for the $Th_1$, $R_1$ assembly, and a current transformer substituted for the $Th_2$, $R_{16}$ assembly. The outputs of these transformers would be opposed to one another in a measuring circuit and balanced for the desired conditions. A change in resistance occurring in load 14 would unbalance these outputs and effect corrective action on the controller. Accordingly, the term "sensors individually monitoring the voltage and the current supplied to the load, thereby obtaining evaluations of the existing resistance level of said load as functions of the parameters load voltage and load current separately" "is intended to include thermistors, potential transformer-current transformer pairs, and the equivalent generically.

What is claimed is:

1. APparatus for maintaining an electrical resistance load having a resistance characteristic varying with temperature at substantially constant operating temperature level comprising, in combination, an electrical power source, means connecting said resistance load to said electrical power source, sensors individually monitoring the voltage and the current supplied to said load, thereby obtaining evaluations of the existing resistance level of said load as functions of the parameters load voltage and load current separately, the output means of said sensors being connected in opposed circuit relationship through a manually settable potentiometer, and power controller means responsive to the position of the tap of said potentiometer and to changes in the outputs of said sensors adjusting concurrently the current and voltage supplied from said electrical power source to said resistance load to maintain the temperature of said resistance load substantially constant independent of the environment in which said resistance load is located.

2. Apparatus according to claim 1 wherein said electrical power source and said power controller are both of the alternating current type.

3. Apparatus according to claim 1 wherein said sensors comprise a voltage monitoring resistor connected in shunt with said resistance load, an electric current monitoring resistor connected in series with said resistance load, and, as output means, individual thermistors disposed in close proximity to said voltage monitoring resistor and to said current monitoring resistor.

4. Apparatus according to claim 1 wherein an amplifier is provided in circuit between said tap of said potentiometer and said power controller.

5. Apparatus according to claim 1 provided with means limiting the maximum electrical current output of said power controller to said electrical resistance load.

6. Apparatus according to claim 1 provided with means limiting the initial rate of change of voltage imposed across said electrical resistance load.

7. Apparatus according to claim 1 wherein said electrical resistance load is a resistance heater.

* * * * *